(12) United States Patent
Dwivedi et al.

(10) Patent No.: US 11,698,802 B2
(45) Date of Patent: Jul. 11, 2023

(54) CUSTOMER SERVICE MANAGEMENT

(71) Applicant: ServiceNow, Inc., Santa Clara, CA (US)

(72) Inventors: Udom Dwivedi, Los Altos, CA (US); Vytesh Ramesh, Fremont, CA (US); Harish Kumar Balachandra Bellamane, San Jose, CA (US); Sanjay Kumar Gupta, Saratoga, CA (US); Evan Ross Lipton, San Jose, CA (US); Vamsi Krishna Soma, Sunnyvale, CA (US)

(73) Assignee: ServiceNow, Inc., Santa Clara, CA (US)

( * ) Notice: Subject to any disclaimer, the term of this patent is extended or adjusted under 35 U.S.C. 154(b) by 196 days.

(21) Appl. No.: 16/950,702

(22) Filed: Nov. 17, 2020

(65) Prior Publication Data
US 2021/0073011 A1    Mar. 11, 2021

Related U.S. Application Data

(63) Continuation of application No. 16/224,359, filed on Dec. 18, 2018, now Pat. No. 10,846,111.

(51) Int. Cl.
| | | |
|---|---|---|
| *G06F 3/048* | (2013.01) | |
| *G06F 9/451* | (2018.01) | |
| *G06Q 10/0631* | (2023.01) | |
| *G06Q 30/016* | (2023.01) | |
| *G06Q 30/02* | (2023.01) | |

(52) U.S. Cl.
CPC ....... *G06F 9/453* (2018.02); *G06Q 10/06316* (2013.01); *G06Q 30/016* (2013.01); *G06Q 30/0281* (2013.01)

(58) Field of Classification Search
CPC . G06Q 30/016; G06Q 10/06316; G06F 9/453
See application file for complete search history.

(56) References Cited

U.S. PATENT DOCUMENTS

| | | | |
|---|---|---|---|
| 6,609,122 B1 | 8/2003 | Ensor | |
| 7,020,706 B2 | 3/2006 | Cates et al. | |
| 7,028,301 B2 | 4/2006 | Ding et al. | |
| 7,062,683 B2 | 6/2006 | Warpenburg et al. | |
| 7,131,037 B1 | 10/2006 | LeFaive et al. | |
| 7,170,864 B2 | 1/2007 | Matharu | |
| 7,350,209 B2 | 3/2008 | Shum | |
| 7,610,512 B2 | 10/2009 | Gerber | |
| 7,617,073 B2 | 11/2009 | Trinon et al. | |
| 7,689,628 B2 | 3/2010 | Garg et al. | |

(Continued)

*Primary Examiner* — Rashawn N Tillery
(74) *Attorney, Agent, or Firm* — Fletcher Yoder PC

(57) ABSTRACT

The present disclosure relates techniques for coordinating and synchronizing client-facing support services with the activities and responses from one or more technical teams assigned to address a client issue. In certain implementations, this may allow an agent or customer approach to use a single reference identifier (such as a case or matter number) to access information or updates from technical teams that do not typically employ such a number for their own tracking purposes. In this manner, relevant information to a client issue may be accessed from all involved technical teams at the agent level as well as allowing the technical teams themselves to readily see activity by other teams.

20 Claims, 12 Drawing Sheets

(56) References Cited

U.S. PATENT DOCUMENTS

| | | |
|---|---|---|
| 7,716,353 B2 | 5/2010 | Golovinsky et al. |
| 7,769,718 B2 | 8/2010 | Murley et al. |
| 7,783,744 B2 | 8/2010 | Garg et al. |
| 7,890,802 B2 | 2/2011 | Gerber |
| 7,925,981 B2 | 4/2011 | Pourheidari et al. |
| 7,930,396 B2 | 4/2011 | Trinon et al. |
| 7,945,860 B2 | 5/2011 | Vambenepe et al. |
| 7,966,398 B2 | 6/2011 | Wiles |
| 8,051,164 B2 | 11/2011 | De Peuter et al. |
| 8,224,683 B2 | 7/2012 | Manos |
| 8,266,096 B2 | 9/2012 | Navarrete et al. |
| 8,402,127 B2 | 3/2013 | Solin |
| 8,457,928 B2 | 6/2013 | Dang et al. |
| 8,478,569 B2 | 7/2013 | Scarpelli et al. |
| 8,612,408 B2 | 12/2013 | Trinon et al. |
| 8,674,992 B2 | 3/2014 | Poston et al. |
| 8,689,241 B2 | 4/2014 | Naik et al. |
| 8,743,121 B2 | 6/2014 | De Peuter |
| 8,832,652 B2 | 9/2014 | Mueller et al. |
| 8,887,133 B2 | 11/2014 | Behnia et al. |
| 9,065,783 B2 | 6/2015 | Ding et al. |
| 9,098,322 B2 | 8/2015 | Apte et al. |
| 9,122,552 B2 | 9/2015 | Whitney et al. |
| 9,239,857 B2 | 1/2016 | Trinon et al. |
| 9,317,327 B2 | 4/2016 | Apte |
| 9,363,252 B2 | 6/2016 | Mueller et al. |
| 9,535,737 B2 | 1/2017 | Joy |
| 9,557,969 B2 | 1/2017 | Sharma et al. |
| 9,645,833 B2 | 5/2017 | Mueller et al. |
| 9,654,473 B2 | 5/2017 | Miller |
| 9,766,935 B2 | 9/2017 | Kelkar et al. |
| 9,792,387 B2 | 10/2017 | George et al. |
| 9,805,322 B2 | 10/2017 | Kelkar et al. |
| 10,243,751 B2 | 3/2019 | Paul et al. |
| 10,594,775 B2 | 3/2020 | Rodriguez |
| 10,785,373 B1* | 9/2020 | Padalkar ............ H04M 3/4933 |
| 2007/0185832 A1 | 8/2007 | Kriebel |
| 2010/0145752 A1 | 6/2010 | Davis et al. |
| 2010/0235838 A1 | 9/2010 | Ibrahim et al. |
| 2010/0250322 A1 | 9/2010 | Norwood |
| 2012/0042003 A1 | 5/2012 | Goetz et al. |
| 2012/0291006 A1 | 11/2012 | Quine |
| 2013/0080201 A1* | 3/2013 | Miller ................... G06Q 10/00<br>705/7.15 |
| 2014/0081691 A1* | 3/2014 | Wendell .......... G06Q 10/06311<br>705/7.15 |
| 2014/0278664 A1 | 9/2014 | Loomis |
| 2015/0242625 A1* | 8/2015 | Cassidy .............. G06Q 10/103<br>726/23 |
| 2016/0065736 A1* | 3/2016 | Pedersen .............. G06Q 30/016<br>379/266.07 |
| 2016/0203434 A1 | 7/2016 | Sivakumar et al. |
| 2016/0224939 A1* | 8/2016 | Chen ................ G06Q 10/06311 |
| 2017/0366582 A1* | 12/2017 | Kothekar .............. H04L 63/101 |
| 2017/0372253 A1* | 12/2017 | Nandi ................... G06Q 10/06 |
| 2018/0159927 A1 | 6/2018 | Wu et al. |
| 2018/0189736 A1* | 7/2018 | Guo ...................... G06Q 10/06 |
| 2018/0322442 A1 | 11/2018 | Gupta et al. |
| 2018/0323984 A1 | 11/2018 | Paul et al. |
| 2018/0323986 A1 | 11/2018 | Paul et al. |
| 2018/0324174 A1 | 11/2018 | Venkata et al. |
| 2018/0324260 A1 | 11/2018 | Barnard et al. |
| 2018/0365053 A1 | 12/2018 | Burroughs et al. |
| 2019/0035503 A1* | 1/2019 | Gonzalez ............ G06Q 10/103 |
| 2019/0102723 A1 | 4/2019 | Gupta et al. |
| 2019/0102746 A1 | 4/2019 | Gupta et al. |

\* cited by examiner

FIG. 10

| NUMBER | SHORT DESCRIPTION | ACTION STATUS | CONTACT | ACCOUNT | CHANNEL | STATE | PRIORITY | ASSIGNED TO | UPDATED |
|---|---|---|---|---|---|---|---|---|---|
| CS0000005 | URGENT ISS... | | G. SMITH | BOXEO | WEB | RESOLVED | 1-CRITICAL | J. MILL... | 2018-10-... |
| CS0001036 | TEST PRB E... | ●NEEDS ATTENTION | J. JONES | BOXEO | WEB | OPEN | 3-MODERATE | J. MILL... | 2018-10-... |
| CS0001028 | ASSOCIATE... | ●NEEDS ATTENTION | J. JONES | BOXEO | WEB | OPEN | 4-LOW | J. MILL... | 2018-10-... |
| CS0001035 | ISSUE WITH... | | J. JONES | BOXEO | WEB | OPEN | 1-CRITICAL | J. MILL... | 2018-10-... |
| CS0001011 | CASE WITH... | ●NEEDS ATTENTION | J. JONES | BOXEO | WEB | OPEN | 2-HIGH | J. MILL... | 2018-10-... |
| CS0001027 | ASSOCIATE... | ●BLOCKED INTERNALLY | J. JONES | BOXEO | WEB | OPEN | 4-LOW | J. MILL... | 2018-10-... |
| CS0001026 | DEMO BLOC... | ●NEEDS ATTENTION | J. JONES | BOXEO | WEB | OPEN | 2-HIGH | J. MILL... | 2018-10-... |
| CS0001007 | ISSUE WITH... | ●NEEDS ATTENTION | J. JONES | BOXEO | WEB | OPEN | 2-HIGH | J. MILL... | 2018-10-... |
| CS0000875 | ROUTE MAK... | | D. WHITE | ELEGAN... | PHONE | OPEN | 2-HIGH | J. MILL... | 2018-10-... |
| CS0000873 | ACME XTRA... | | M. DAVIS | SPARK T... | WEB | OPEN | 1-CRITICAL | J. MILL... | 2018-10-... |
| CS0000009 | ADVANCED A... | | J. JONES | BOXEO | WEB | AWAITING INFO | 3-MODERATE | J. MILL... | 2018-10-... |

CUSTOMER SERVICE MANAGEMENT

CROSS-REFERENCE TO RELATED APPLICATIONS

This application is a continuation of and claims priority to U.S. application Ser. No. 16/224,359, filed Dec. 18, 2018, and entitled, "CUSTOMER SERVICE MANAGEMENT," the disclosure of which is incorporated by reference in its entirety for all purposes.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

One aspect of IT management and support, as with any technical endeavor, is addressing client requests and problems so as to allow continued or improved operation of such resources in support of the client. This may be both more complex and more important in a cloud-based environment in view of the number of components and links involved in providing the IT infrastructure, the complexity of the platform, and the geographic separation between aspects of the platform.

One example of issues that may arise in such a context is the separation between the client-facing support team, such as a customer agent, who coordinates with a client to address requests, incidents, and problems, and the disparate technical teams that may provide the technical analysis or solution to such issues. Indeed, different technical teams or departments may exist for different types of client issues, each maintaining their own tracking and nomenclature. As a consequence, a customer agent or the client may not be able to readily obtain, coordinate, or assess the activities or responses related to a given request or problem in an efficient manner.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates techniques for coordinating and synchronizing client-facing support service with the activities and responses from one or more technical teams assigned to address a client request, incident, problem, and so forth. In certain implementations, this approach is provided on a single platform, and may allow service matters to be indexed or accessed using a common or shared identifier (e.g., a case or reference number) that facilitates accessing information from all involved technical teams at the agent level as well as allowing the technical teams themselves to readily see activity by other teams.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 10 depicts an example screen of a listing of cases as may be presented to a case agent, in accordance with aspects of the present disclosure;

DETAILED DESCRIPTION

Figure 1:
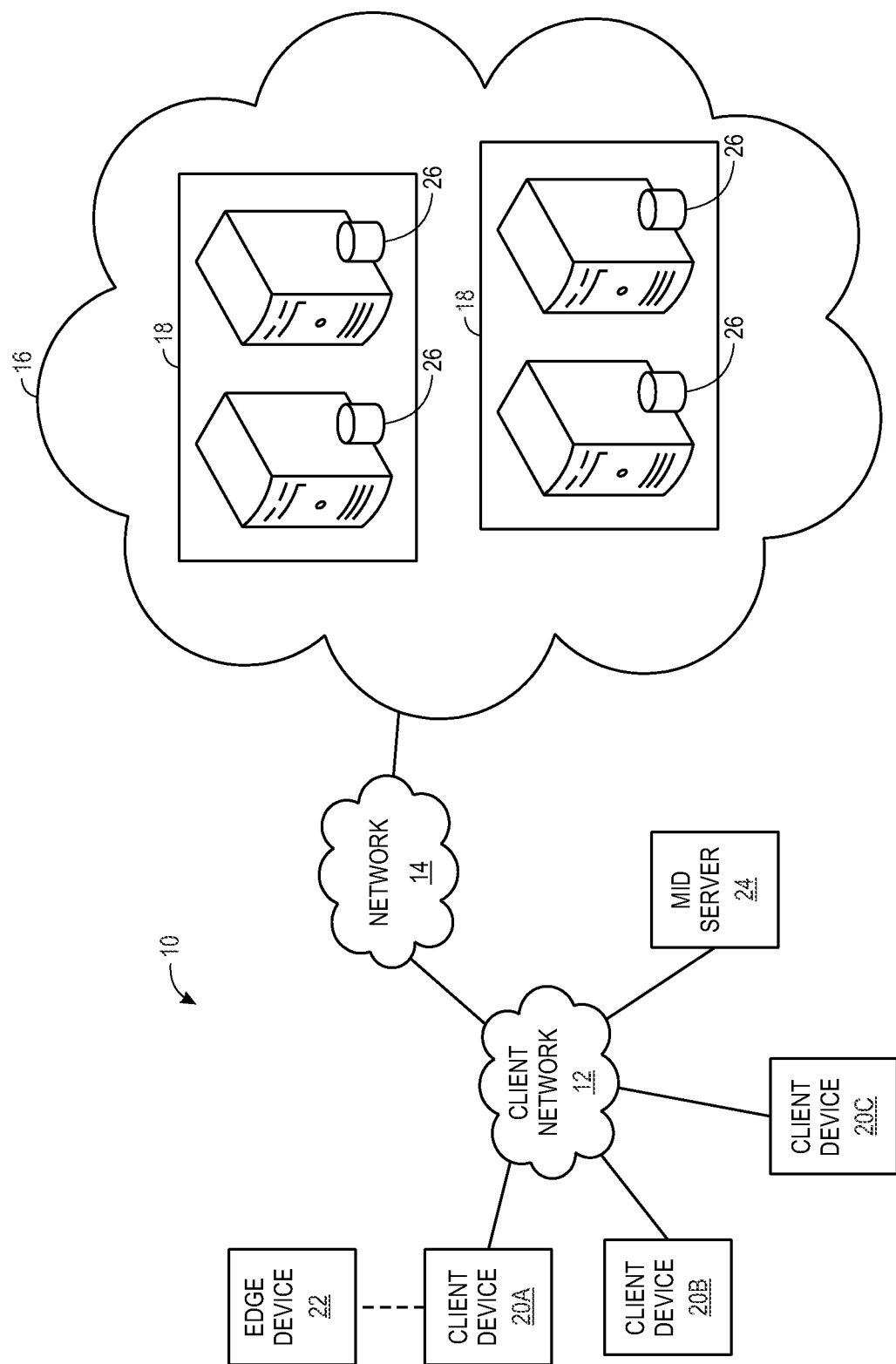
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code. As used herein, the terms alerts, requests (REQs), incidents (INTs), changes (CHGs), and problems (PRBs) are used in accordance with the generally accepted use of this terminology in the information technology (IT) customer service context and may be defined in greater detail, or concrete examples provided, herein. Moreover, the term "issues" with respect to customer service in an IT context as used herein collectively refers at least to requests, incidents, problems, and changes.

As discussed herein, the present disclosure relates techniques for coordinating and synchronizing client-facing support services with the activities and responses from one or more technical teams assigned to address a client issue. In certain implementations, this may allow an agent or customer approach to use a single reference (such as a case or matter number) to access information or updates from technical teams that do not typically employ such a number for their own tracking purposes. In this manner, relevant information to a client issue may be accessed from all involved technical teams at the agent level as well as allowing the technical teams themselves to readily see activity by other teams. By way of example, a common interface, such as a customer service management interface used by a customer service agent, may be used to review and access information pertinent to an issue from multiple technical groups of teams that do not typically reference or index their activities using the customer service matter identifier (e.g., matter or case number). Further, the customer service management interface may be updated or synchronized based on the shared matter identifier to reflect all activity by the relevant technical teams or groups. A customer service agent may then use the interface to track progress on a client issue being worked and/or to generate additional action items for a given technical team or group based on the observed progress or status. In a further aspect, a customer service agent, using the approaches described herein, may associate multiple cases or matters from different clients for root cause analysis or based on an identified common root cause to allow the agent to handle the related cases in an expeditious manner.

With the preceding in mind, the following figures relate to various types of generalized system architectures or configurations that may be employed to provide services to an organization in a multi-instance framework and on which the present customer service management approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
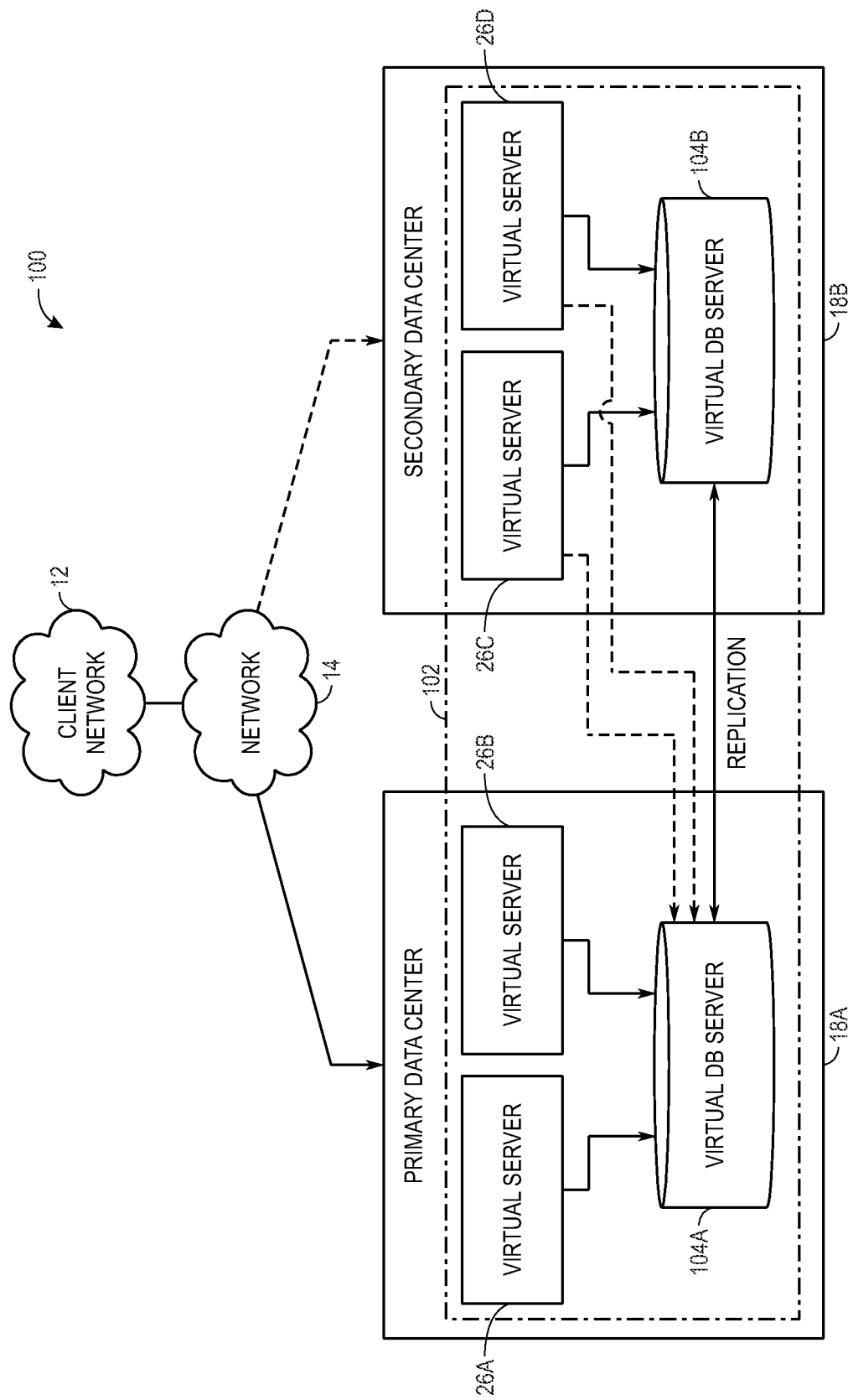
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
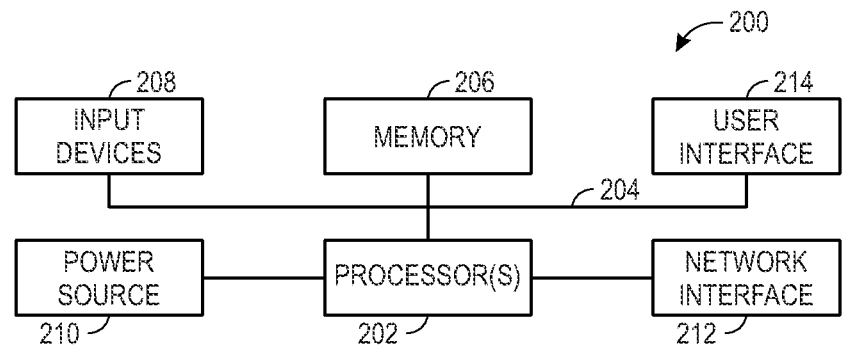
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
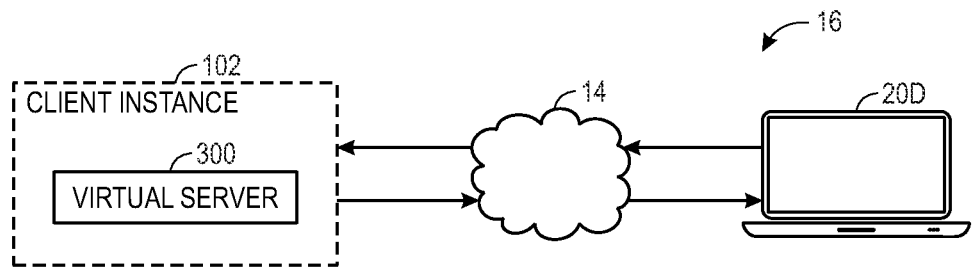
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser. With this in mind, the present customer service management discussion may be relevant to addressing issues experienced by a user with respect to a client device 20, the client instance 102, and application node or database accessed via the instance, or other relevant IT contexts, including those that do not occur within an instanced environment as described in the above examples.

Figure 5:
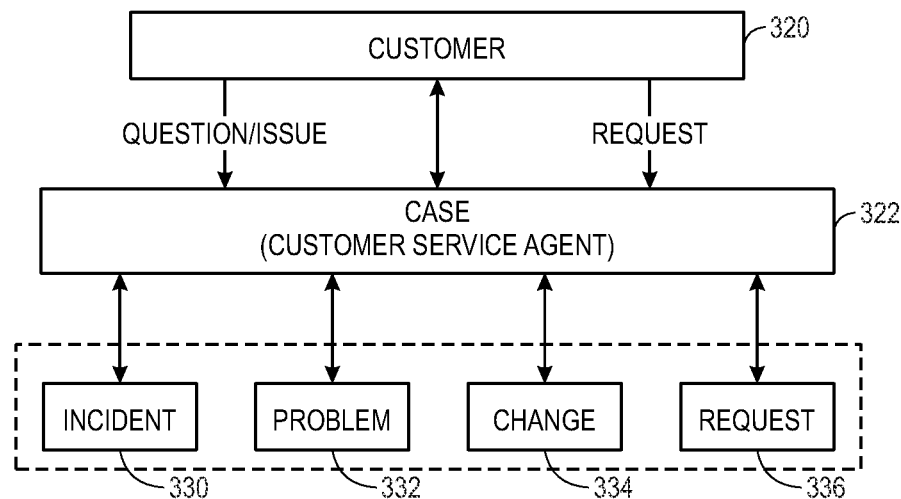
FIG. 5 depicts an overview of various aspects of an IT customer service management process in accordance with aspects of the present disclosure.

Turning to FIG. 5 a high-level overview of various aspects of an IT customer service issue resolution are illustrated. In this example, a user 320 at a client site (e.g., a user of a client device 20 or who interacts with a client instance 102) may generate a customer service case 322, such as in response to a question or reported issue or a request. The case may be generated in response to an automated interaction between the user 320 and the customer service platform or by a customer service agent who evaluates the communication from the user 320 and opens a corresponding case 322 if needed. It may also be noted, that the aspects of the present approach discussed herein may afford a customer (e.g., user 320) control over which agents or types of agents (e.g., based on certifications, experience, prior history, and so forth) can perform or open which actions with respect to a case. For example, a customer may stipulate that only agents 322 having so many years of experience or certain certifications may request a change be made to their system. Once the case 322 is opened, one or more technical groups (e.g., an incident response team 330, a problem team 332, a change implementation team 334, a request handling team 336, and so forth) may perform respective actions defined by their roles to resolve the case 322.

As discussed in greater detail below, various aspects of this process may be handled in accordance with the present approach to improve visibility of progress with respect to the case 322 to the user 320 and/or customer service agent. By way of example, various use cases and process flows are described below for different service contexts.

Figure 6:
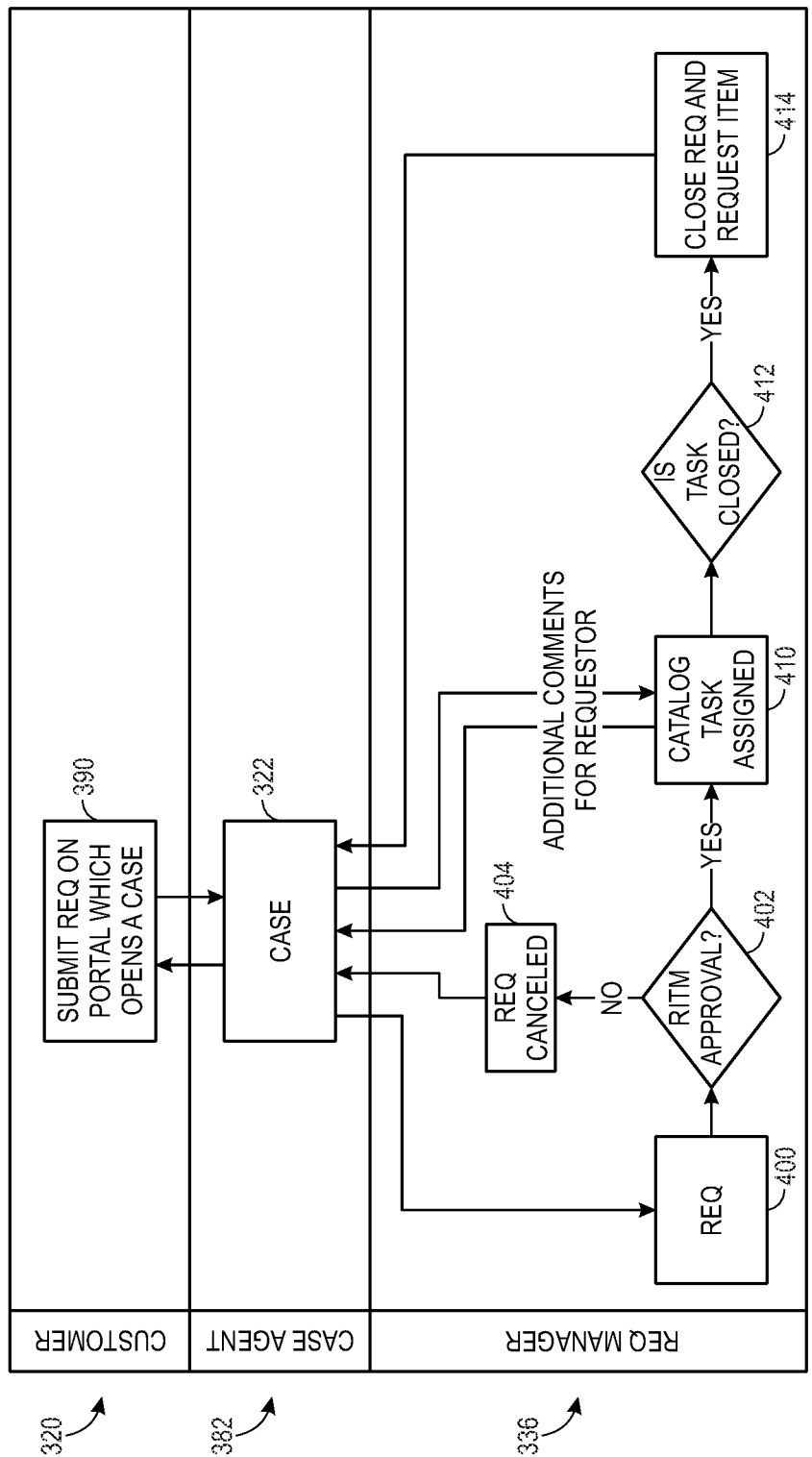
FIG. 6 depicts a swim-lane type view of a request scenario in accordance with aspects of the present disclosure.

With this in mind, and turning to FIG. 6, a request scenario is described. As used herein, a "request" in the customer service context corresponds to a request by the customer for a feature, device, service, and so forth that the customer wants to add to their existing service and/or is entitled to add. For example, a request as used herein may be for an upgrade or addition to available cloud resources, for an additional hardware device (e.g., a new or additional laptop), for a defined or common service (e.g., a password reset or change). With respect to the present discussion the request for a service, action, or hardware, may be associated with a defined or known process and may be related to a frequently asked for or common item or service. For example, a request may result from a selection by a customer of a service or item from an online catalog of services or items offered to the customer, such as may be made available via customer service management portal.

With this in mind, and turning to FIG. 6, a swim lane type view is presented defining steps in a request fulfillment process in accordance with the present approach and how such steps may be characterized in terms of the relevant party, i.e., customer 380, case agent (real or virtual) 382, and technical group, here the request handling team 336. In this example, the customer 320 initially submits (step 390) a request 400, such as via a service portal accessed on a client instance. As noted above, the request 400 may be submitted by selecting a service option from a menu of such options or making a selection from an online catalog of items or services.

In response to the submission 390 of the request 400, a case 322 is opened, either by a case agent 382 or in an automated manner (e.g., a virtual agent or automated routine) in response to the submission 390. As discussed herein, the case 322 may have an associated reference identifier (e.g., matter number or case number) by which the customer 320 and/or case agent 382 reference and relate to the case 322.

The request 400 associated with the case 322 may be opened as a matter to be handled by the corresponding technical group, here request handling team 336. As noted above, the technical group may have its own defined matter referencing and/or tracking system. However, in accordance with this approach, the request 400 may still be associated with and tracked by the reference identifier associated with the case 322 to which the case agent 382 and/or customer 320 may refer. In the request example, requests 400 may have defined steps or processes for fulfilling the request, such as may be the case for a password reset or other common, well-defined requests.

In the depicted example, a request may have multiple parts or items (e.g., request Items (RITM)), each of which may need to be approved or evaluated at step 402. If an item in the request 400 is not approved at step 402, either the entire request 400 may be canceled or the request may be modified to cancel the unapproved item, as shown at step 404. In the event of a partial or complete request cancelation, the case 322 may be updated as shown so as to allow the case agent 382 and/or customer 320 to observe the current status of the request 400 and to take any needed corrective action.

For requests or request items approved at step 402, one or more fulfillment tasks may be assigned (step 410) to request team members to handle the processing of the request 400. Assignment of the request or request items and feedback to and from request team members (such as requests for additional information or clarifications) may be added to the case 322 as shown to allow the agent 382 and/or customer 320 provide any additional guidance or information needed to fulfill the request 400. Request fulfillment tasks may continue to be performed until all tasks are determined to be closed or completed (step 412), at which point the request 400 may be closed (step 414) in the request handling team's workflow and the case 322 correspondingly updated.

With the preceding in mind, certain aspects of the present approach may be noted. In accordance with this approach, a case 322 may be automatically created in response to a customer request submission 390. The customer and the case agent, may reference the request 400 throughout the process using the reference identifier for the case 322, without having to know the tracking reference used by the technical group, i.e., there is a single point of reference for the customer 320 and agent 382 to track and use. Further, requests 400 and the corresponding fulfillment actions are updated to and automatically synchronized with the case 322, which may be on a platform distinct from that employed by the technical team.

While requests 400 represent known or defined processes for routine tasks or services provided to a customer, in other circumstances the service issue may be less defined. For example, a problem (PRB) scenario is described as one such issue. As used herein, a "problem" in the customer service context, unlike a request, does not relate to a standardized activity or known process. Instead, a "problem" would typically correspond to an event in which the customer has a failure or mis-performance in supported hardware, software, communications, and so forth. Such a failure, in certain example, may be associated with an error or failure code or other reportable message generated in response to the event. For example, a "problem" as used herein may constitute a hardware failure or crash, an application or operating system error message or crash, a network or connection failure, failure to mount or access a database, and so forth. As used herein, a problem is typically addressed by making a change to an application or system, such as applying an update or patch or other fix, and may be distinct from an incident where such changes may not be needed to address a technical problem.

Figure 7:
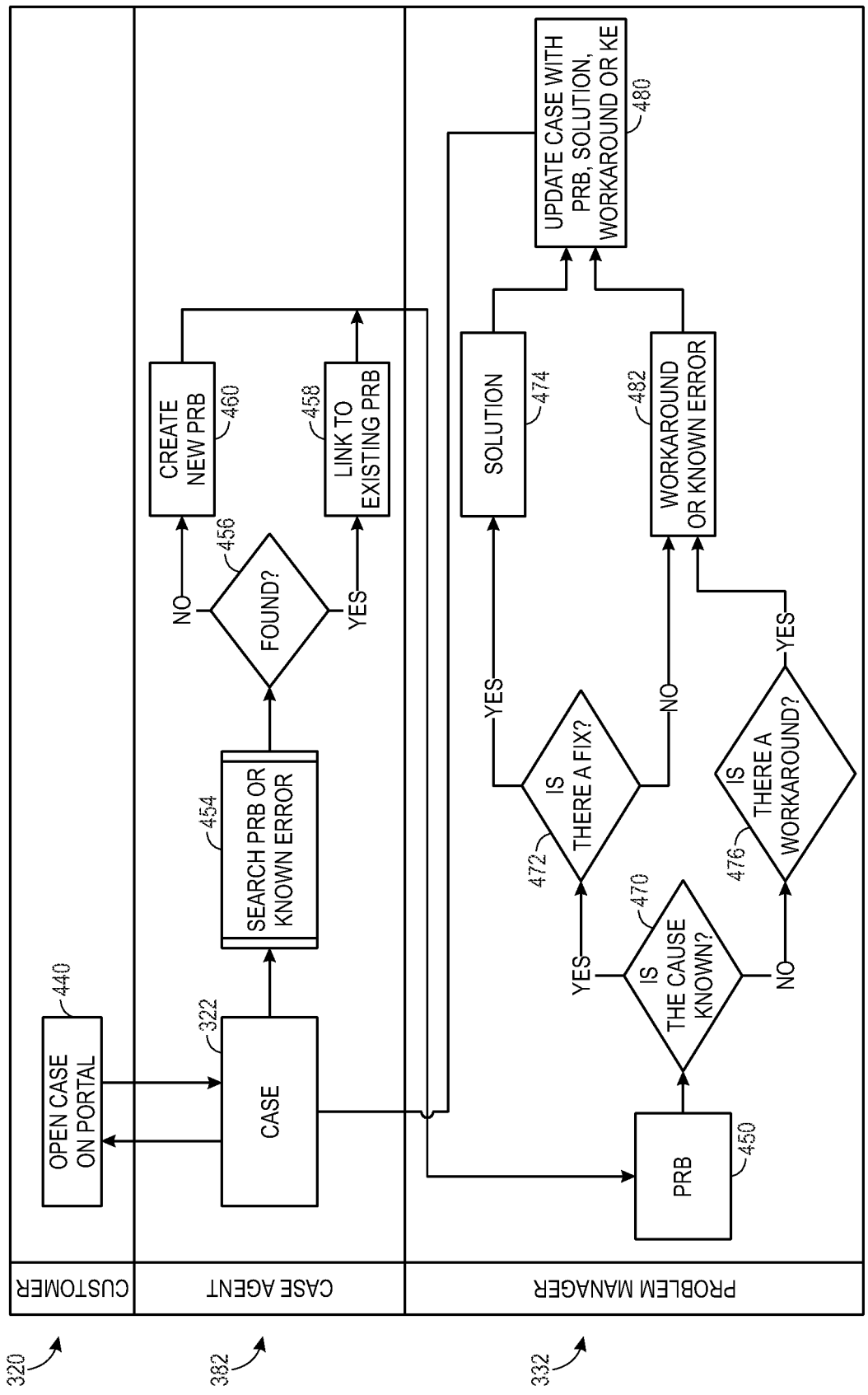
FIG. 7 depicts a swim-lane type view of a problem scenario in accordance with aspects of the present disclosure.

With this in mind, and turning to FIG. 7, another swim lane type view is presented defining steps in a problem identification process in accordance with the present approach and how such steps may be characterized in terms of the relevant party. In this example, the customer 320 initially opens (step 440) a case 322 to report a problem 450, such as via a service portal accessed on a client instance. As discussed herein, the case 322 may have an associated reference identifier (e.g., matter number or case number) by which the customer 320 and/or case agent 382 reference and relate to the case 322. As noted above, the submission of the problem may include an error or failure code or other reportable messages generated by the problem. Similarly, a screenshot may be submitted as part of the problem reporting to facilitate evaluation of the problem.

In the depicted example, a case agent 382 may initially review the submission from the customer 320 regarding the problem 450. Based on the submission, the case agent 382 may initially try to identify the problem 450 or a cause of the problem 450. For example, the case agent 382 may perform a search 454, such as based upon a provided error code or other submitted details to attempt to identify the problem in a database of known problems. If the problem 450 is found (block 456) based on the search, the case 322 may be linked to (step 458) or otherwise reference the existing or known problem 450. In this scenario, by linking the case 322 with the known problem 450, the case agent 382 may be able to more efficiently identify a root cause for the submitted problem and may have better information at an earlier stage of the process. Conversely, if the problem 450 is not found (block 456) a new problem 450 may be created and submitted to the problem identification team 332 for identification of a root cause. With this in mind, one case 322 may be linked to one problem 450, but one problem 450 may be linked to multiple cases 322, such as where a problem 450 affects multiple clients or client instances.

As shown in the example of FIG. 7, the problem 450 associated with the case 322 may be opened as a matter to be handled by the corresponding technical group, here problem identification team 332. As mentioned above, the matter referencing and/or tracking system of the technical group may not be based on the case reference identifier. However, in accordance with this approach, the problem 450 may still be associated with and tracked by the reference identifier associated with the case 322 to which the case agent 382 and/or customer 320 may refer.

In the depicted example, an initial determination (block 470) may be made by the problem team 332 to determine of the cause of the problem 450 is known. If the cause is known, an additional determination (block 472) may be made as to whether a solution 474 for the problem 450 exists. If so, the case 322 may be updated (step 480) to reflect the solution 474. If the cause is not known, an additional determination (block 476) may be made as to whether a workaround for the problem 450 exists. If there is no solution 474 but there is a workaround or the cause of the problem is known (block 482), the case 322 may instead be updated (step 480) to reflect the workaround or known error. If the problem 450 has no known root cause, workaround, or solution, the case 322 may instead be updated to reflect that the problem is under investigation.

As in the preceding example, the automatic synchronization of data between the technical team and the case agent 382 at the level of the case 322 improves the ability of the case agent 382 to communicate with the customer with timely and accurate information regarding the problem. Further, the customer and the case agent, may reference the problem 450 throughout the process using the reference identifier for the case 322, without having to know the tracking reference used by the technical group, i.e., there is a single point of reference for the customer 320 and agent 382 to track and use. Further, problems and the corresponding resolution activity are updated to and automatically synchronized with the case 322, which may be on a platform distinct from that employed by the technical team.

In response to identifying a problem, or in other administrative contexts or the normal operational scheme, one or more changes (e.g., system or application updates, application of patches, installation of driver, and so forth) may also be implemented as part of customer service management operations. As used herein, a "change" may be considered distinct from a "problem" in that is it performed by a technical team either to address a problem or as part of recommended service management or practice. As discussed in the present example, the change implementation team 334 may be distinct and different from the problem identification team 332. In cases where the change is made to address a problem, and consistent with the present approach, the same case 322 may be updated with both the problem and change information so that the customer 320 and case agent 382 can access both the current problem and change information via the case 322, even when the change team 334 and problem team 332 employ different tracking systems and platforms to perform their respective operations.

Figure 8:
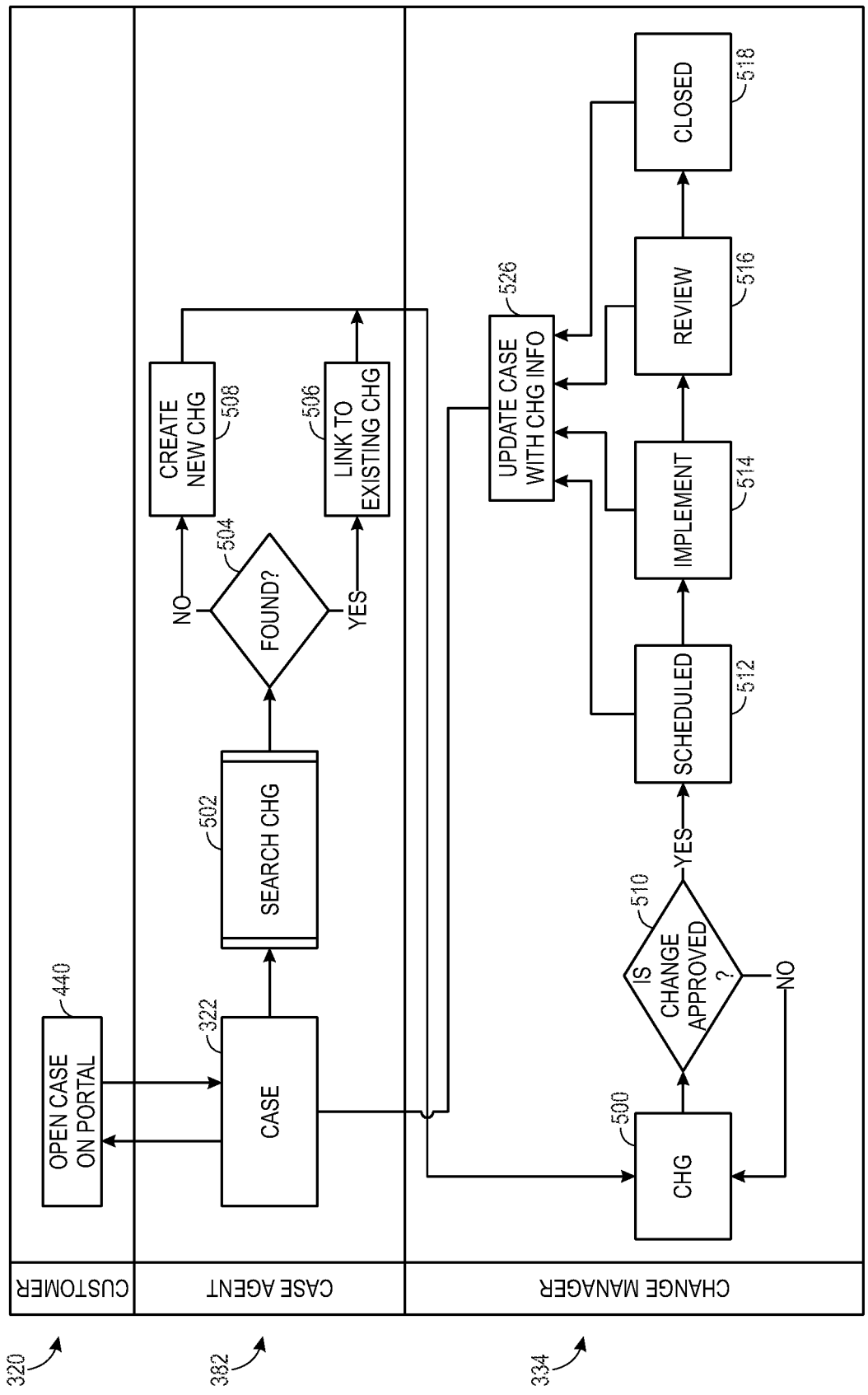
FIG. 8 depicts a swim-lane type view of a change scenario in accordance with aspects of the present disclosure.

With this in mind, and turning to FIG. 8, a swim lane type view is presented defining steps in a change implementation process in accordance with the present approach and how such steps may be characterized in terms of the relevant party. In this example, the customer 320 may open (step 440) a case 322 to request a change 500, such as via a service portal accessed on a client instance. Alternatively, as noted above, the change 500 may be initiated by the case agent 382 as part of an ongoing case 322, such as in response to a problem 450 being identified and the change 500 being indicated as a possible solution 474 or workaround. As discussed herein, the case 322 may have an associated reference identifier (e.g., matter number or case number) by which the customer 320 and/or case agent 382 reference and relate to the case 322.

In the depicted example, a case agent 382 may initially review or search the change (step 502), such as to determine if the change 500 already scheduled to be implemented. For example, as with problems, a change 405 (such as a system wide update, bulk patch, equipment repair or upgrade, and so forth) may be linked to multiple cases 322, such as where the change 500 affects multiple clients or client instances, though each case is typically linked to only one change. If the change 500 is found (block 504) to already be scheduled, the case 322 may be linked to (step 506) or otherwise reference the scheduled change 500. Conversely, if the change 500 is not currently scheduled (block 508) a new change 500 may be created and submitted to the change implementation team 334.

As shown in the example of FIG. 8, the change 500 associated with the case 322 may be opened as a matter to be handled by the corresponding technical group, here change implementation team 334. As mentioned above, the matter referencing and/or tracking system of the technical group may not be based on the case reference identifier. However, in accordance with this approach, the change 500 may still be associated with and tracked by the reference identifier associated with the case 322 to which the case agent 382 and/or customer 320 may refer.

In the depicted example, an initial determination (block 510) may be made by the change implementation team 332 to determine if the change 500 is approved. If not, the process does not proceed until the change 500 receives approval. Once the change 500 is approved, the change 500 is scheduled (step 512) and the case 322 may be updated (step 526) with the scheduling information. When the scheduled time is reached, the change implementation team 334 may implement (step 514) the change 500. Post-implementation a review (step 516) may be conducted to determine whether the change 500 has been implemented correctly and that no new issues are evident. Upon conclusion of the review, the change task may be closed (step 518) by the change implementation team 334. At each stage of the change implementation process (e.g., scheduling 514, implementation 516, review 516, and close 518) the case 322 may be updated (step 526) to reflect the current status of the change 500.

It may be noted that, due to being able to link multiple types of activity at the level of the case 322, more information may be made available to the case agent 382 and customer 320 that is typically the case. As noted above, for example, change tracking may be added to a case in response to prior problem identification, allowing the agent 382 to view activity by both technical groups. For example a change task 500 may be added to a case 322 in response to identification of a cause of a problem 450, allowing the agent 382 to access both technical group's activities via the case 322. Conversely, to the extent a change 500 creates a problem 450 (e.g., an applied change results in a performance regression, causing the customer to open a problem), this linkage between the change resulting in the problem may also be seen in the interface proved to the case agent 382. Such information may be particularly useful in allowing case agents 382 to see how many problems results from a change being applied.

As in the preceding example, the automatic synchronization of data between the technical team and the case agent 382 at the level of the case 322 improves the ability of the case agent 382 to communicate with the customer with timely and accurate information regarding the change. Further, the customer and the case agent, may reference the change 500 throughout the process using the reference identifier for the case 322, without having to know the tracking reference used by the technical group, i.e., there is a single point of reference for the customer 320 and agent 382 to track and use. Further, change implementation process and milestones are updated to and automatically synchronized with the case 322, which may be on a platform distinct from that employed by the technical team.

In addition to requests, problems, and changes, another type of issue routinely handled by case agents 382 are incidents. Such incidents may be viewed as distinct from problems, which typically are addressed by applying a change, but may still require help or action from a technical team. By way of example, an incident correspond to an occurrence that may be resolved by actions such as rebooting or restarting an application node, a database server, or a piece of hardware (e.g., a physical server, load balancer, and so forth) or other actions short of applying a change to a system or application.

Figure 9:
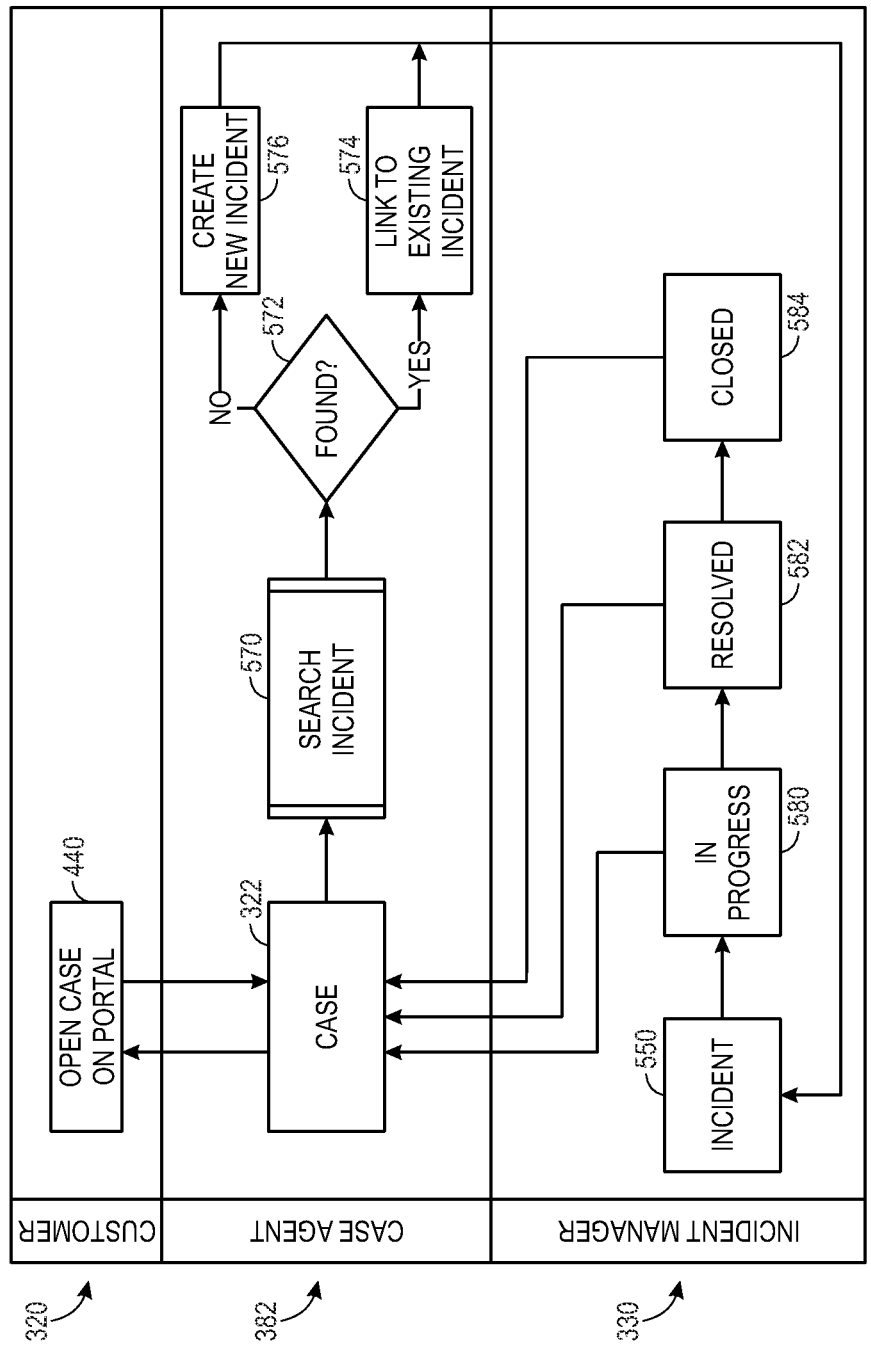
FIG. 9 depicts a swim-lane type view of an incident scenario in accordance with aspects of the present disclosure.

With this in mind, and turning to FIG. 9, a further swim lane type view is presented defining steps in an incident resolution process in accordance with the present approach and how such steps may be characterized in terms of the relevant party. In this example, the customer 320 initially opens (step 440) a case 322 to report an incident 550, such as via a service portal accessed on a client instance. As discussed herein, the case 322 may have an associated reference identifier (e.g., matter number or case number) by which the customer 320 and/or case agent 382 reference and relate to the case 322. The submission of the incident information may include codes, error messages, or text that describe or characterize the incident. Similarly, a screenshot may be submitted as part of the incident reporting to facilitate evaluation of the incident.

In the depicted example, a case agent 382 may initially review the submission from the customer 320 regarding the incident 550. Based on the submission, the case agent 382 may initially try to evaluate the incident 550 and, in particular, see if the incident already has been reported, such as by another customer. For example, the case agent 382 may perform a search 570, such as based upon information describing the incident submitted by the customer 320. If the incident 550 is found (block 572) to already exist, the case 322 may be linked to (step 574) or otherwise reference the existing or known incident 550. In this scenario, by linking the case 322 with the known incident 550, the case agent 382 may be able to more efficiently identify a cause for the submitted incident and may have better information at an earlier stage of the process. Conversely, if the incident 550 is not found (block 576) a new incident 550 may be created and submitted to the incident resolution team 330 for resolution. With this in mind, as in preceding examples, one case 322 may be linked to one incident 550, but one incident 550 may be linked to multiple cases 322, such as where an incident 550 affects multiple clients or client instances.

As shown in the example of FIG. 9, the incident 550 associated with the case 322 may be opened as a matter to be handled by the corresponding technical group, here incident resolution team 330. As mentioned above, the matter referencing and/or tracking system of the technical group may not be based on the case reference identifier. However, in accordance with this approach, the incident 550 may still be associated with and tracked by the reference identifier associated with the case 322 to which the case agent 382 and/or customer 320 may refer.

In the depicted example, the incident 550, may be processed or worked by the incident resolution team (i.e., may be "in progress" (block 580)). Once corrective action is taken by the incident resolution team, the incident may be deemed to be resolved (block 582) and upon confirmation of the successful resolution of the incident 550, the status may be changed to closed (block 584) in the technical team's task list. At each stage of the incident resolution process (e.g., in progress 580, resolved 582, and closed 584) the case 322 may be updated to reflect the current status of the incident resolution process.

As in the preceding examples, the automatic synchronization of data between the technical team and the case agent 382 at the level of the case 322 improves the ability of the case agent 382 to communicate with the customer with timely and accurate information regarding the incident. Further, the customer and the case agent, may reference the incident 450 throughout the process using the reference identifier for the case 322, without having to know the tracking reference used by the technical group, i.e., there is a single point of reference for the customer 320 and agent 382 to track and use. Further, incident resolution activity is updated to and automatically synchronized with the case 322, which may be on a platform distinct from that employed by the technical team.

With the preceding in mind, and by way of providing a practical example of a real world implementation of the present approach, the following figures depict sample screenshots of an interface that may be interacted with by a case agent 382 to process cases 322 as discussed herein. Turning to FIG. 10, an example, of a case list screen 600 listing cases 322 being worked by a respective case agent 382 is shown. Each case is identified by a reference identifier 604, here a case number, and includes a brief description 608, action or task status 612, contact 616, customer account 620, channel 624, case state 628, priority 632, assignment 636, and update time stamp 640.

Figure 11:
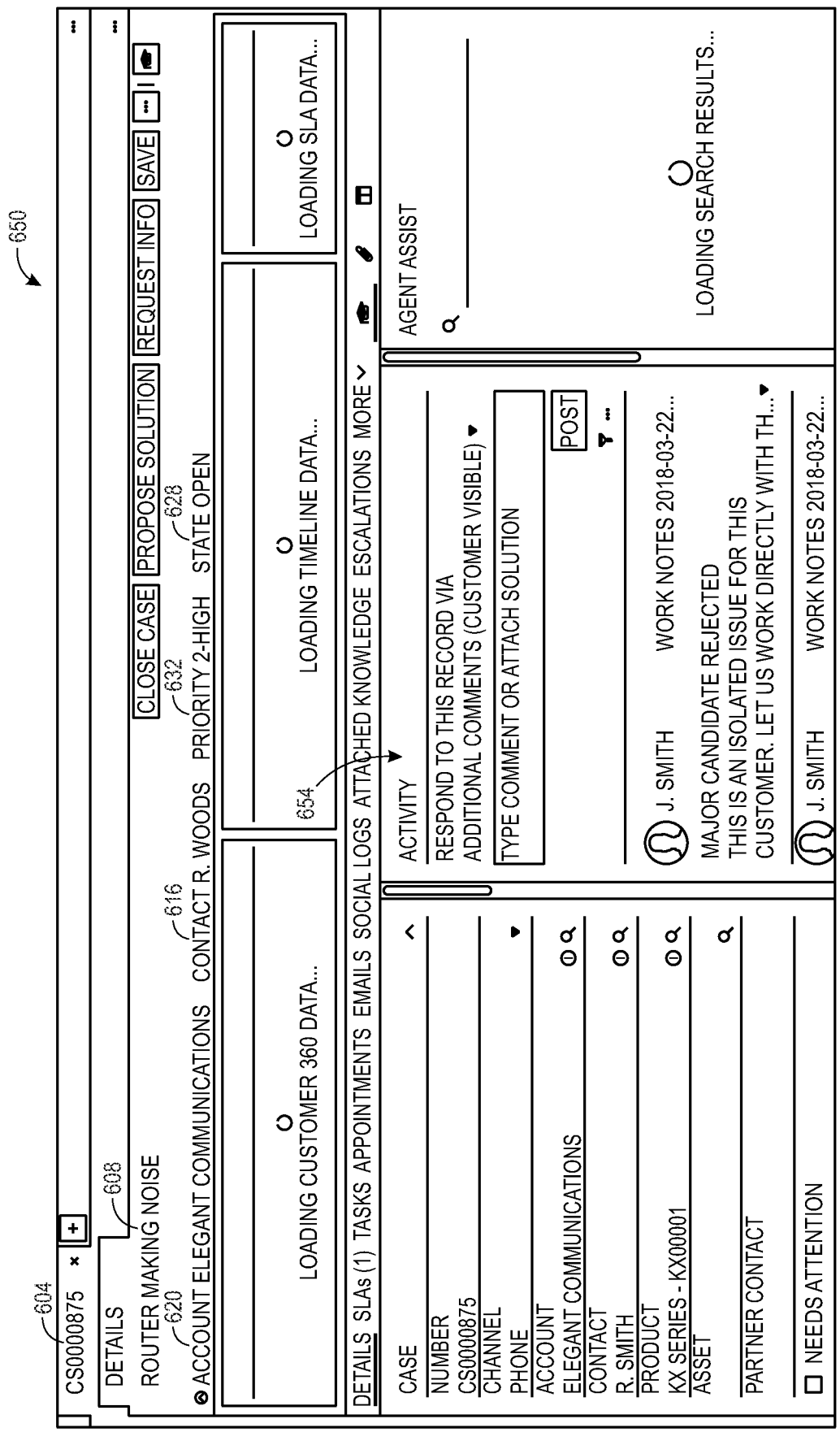
FIG. 11 depicts an example screen of details for a case as may be presented to a case agent, in accordance with aspects of the present disclosure.

Turning to FIG. 11, upon selection of a case 322 to be worked on, a case detail screen 650 may be displayed. The case detail screen 650 in this example includes some or all of the data present on the case listing screen and in addition may include additional data, such as an activity log or listing 654 which may be reviewed, changed, updated, or added to by the case agent 382 and which may include notes useful to the agent for determining a history and current disposition of a case 322.

Figure 12:
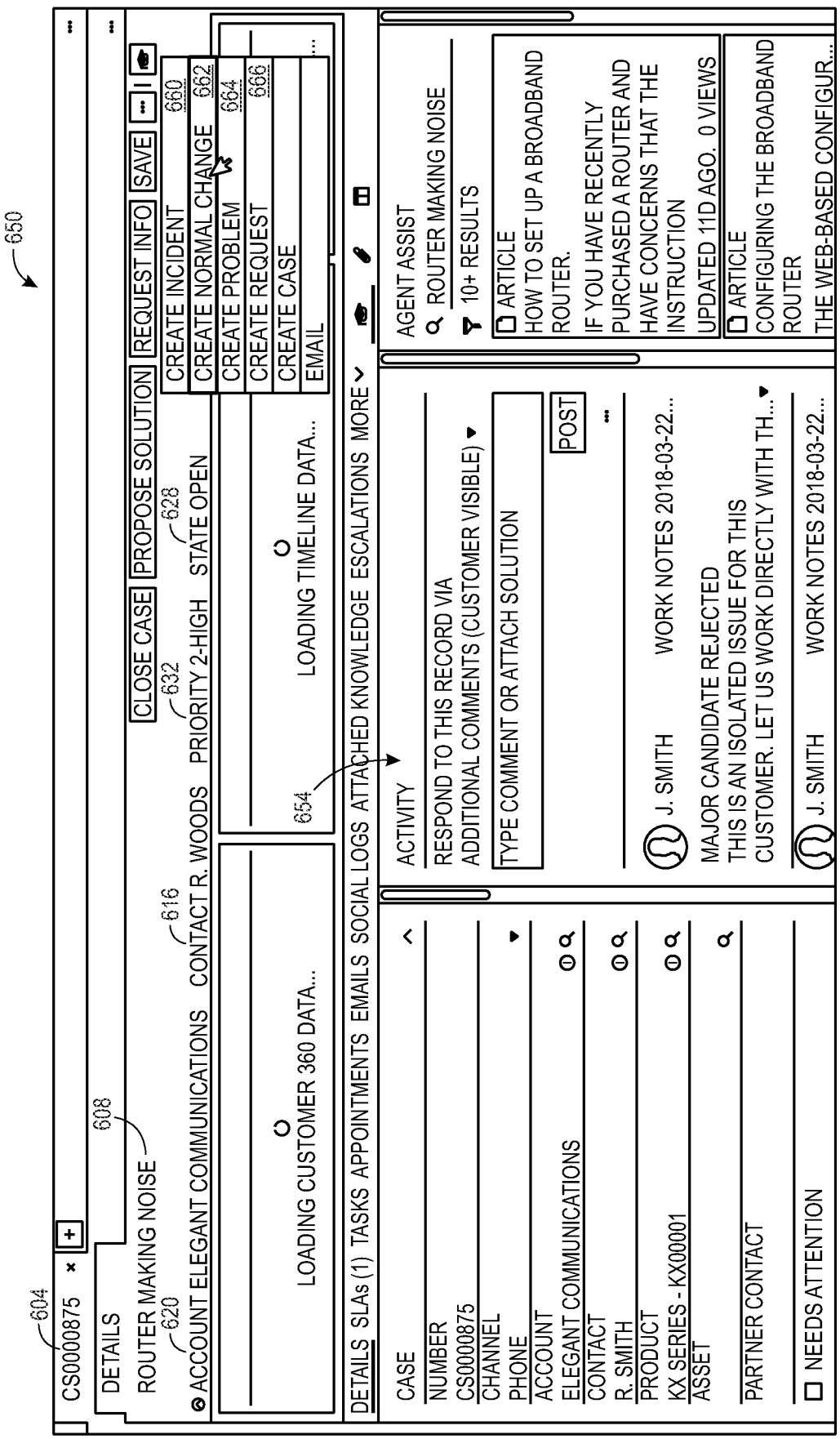
FIG. 12 depicts an example of a case detail screen showing options for a case agent to generate a request, incident, problem, or change associated with the case, in accordance with aspects of the present disclosure.

Turning to FIG. 12, via the case detail screen 650 of the present example, a case agent 382 may, as discussed in greater detail above, create an incident (option 660), create a change (option 662), create a problem (option 664), or create a request (option 666). Thus, for a given case, a case agent 382 may create or initiate a variety of technical services that remain linked to the case, despite the respective technical groups providing the technical service potentially employing a different tracking system or nomenclature.

Figure 13:
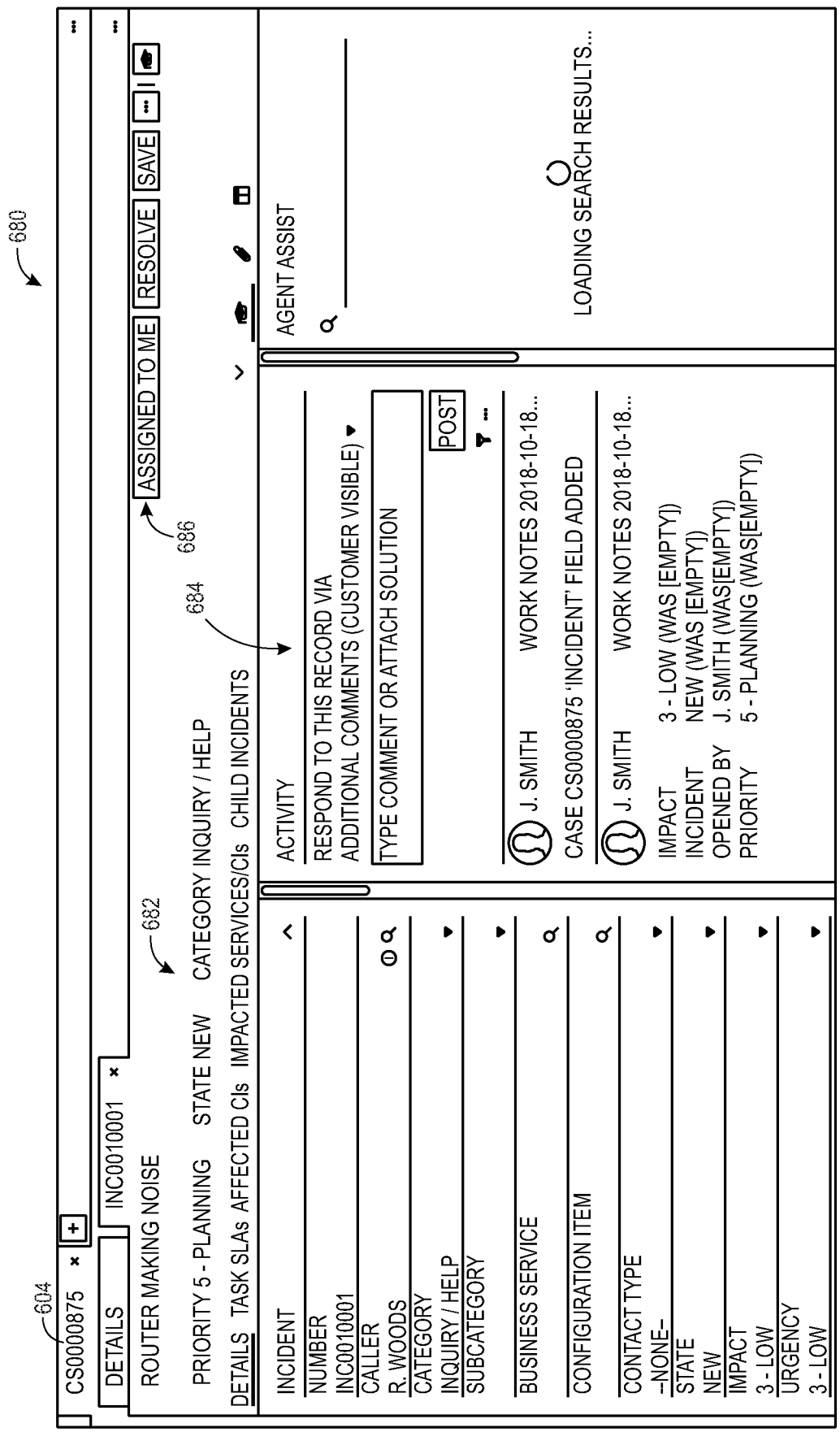
FIG. 13 depicts an example screen of details for an incident generated for a case, in accordance with aspects of the present disclosure.

By way of example, and turning to FIG. 13, an incident screen 680 is illustrated for the case in question and which may be generated in response to the case agent 382 selecting the create incident option 660 illustrated in FIG. 12. Thus, as shown, the incident details 682 are accessible along with case details within the case itself, as represented by case reference identifier 604. Information relevant to an incident (e.g., incident details, tasks, affected applications and/or hardware, affected services, and so forth) may be presented, along with details regarding the priority, state, and category of the incident. Similarly, the presence of, or connections to, child or related incidents is also provided so as to be accessible within the case information. Prior activity 684 relevant to work done to resolve the incident may also be shown. In addition, actions or status updates 686 available to the case agent 382 from the incident screen (e.g., assign, save, resolve, and so forth) may also be available within the incident screen.

Figure 14:
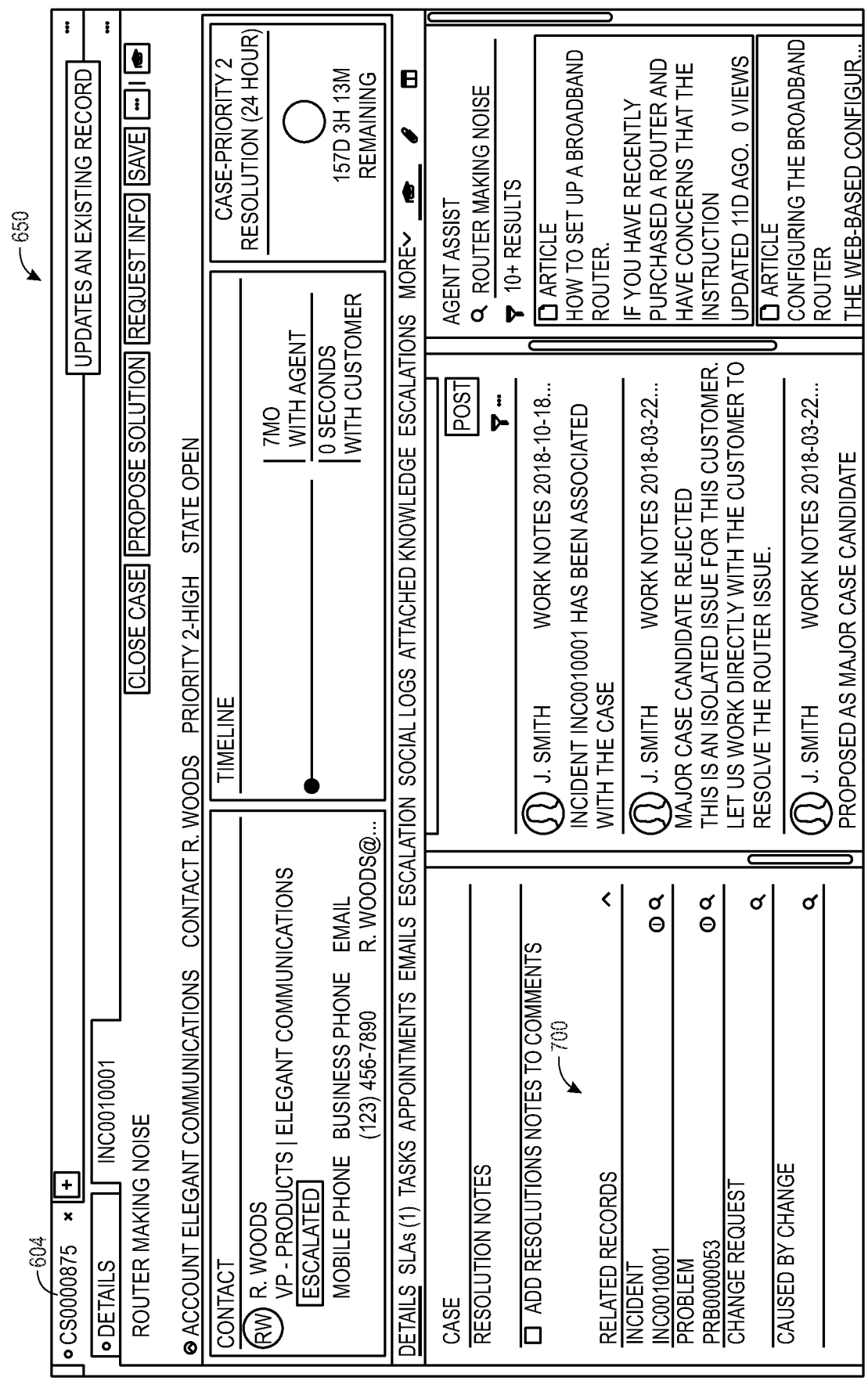
FIG. 14 depicts an example of a case detail screen showing related records associated with the case, in accordance with aspects of the present disclosure.

Returning to the case detail screen 650, and turning to FIG. 14, an additional feature described herein is illustrated. In particular, as noted herein, in accordance with the present approach a given case may be associated over its history with more than one problem, incident, request, change, and so forth. For example, a case may initially be associated with identifying a problem arising from a customer submission. Upon identification of the problem, a change may be created and associated with the case. With such possible chains of technical services being associated with a case, FIG. 14 depicts how a case detail screen 650 (or other suitable screen) may also display related records 700 related to different technical services. In this example, the depicted case is associated with both an incident and a problem, which may arise in a scenario where an incident is initially created and subsequently determined to be a problem (e.g., requiring a change) or in which a problem is initially created but subsequently determined to be better resolved as an incident (e.g., no change needed to resolve). Alternatively, the case in question may justifiably involve being associated with a problem and an incident, requiring both technical teams to fully address all issues raised by the customer and associated with the case.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method for managing a service task of a service case, comprising:
receiving, from a case agent of a communicatively coupled customer service platform, a request to perform the service task at a service team of a plurality of service teams, wherein each of the plurality of service teams is assigned a respective service task related to the service case, wherein the request comprises a case reference identifier that identifies the service case on the customer service platform for a client, wherein each of the plurality of service teams employs a respective tracking system that is separate and distinct from the customer service platform, and wherein each respective tracking system uses a respective technical team identifier that is separate and distinct from the case reference identifier to process and update the respective service task;
identifying, within the respective tracking system of the service team, a root cause for the service task based on the respective technical team identifier of the service task being linked to one or more known cases corresponding to one or more known resolutions; and
updating, within a database of the customer service platform, data associated with the service task using the respective technical team identifier, wherein the data is accessible from a customer service management interface of the customer service platform using the case reference identifier without reference to the respective technical team identifier of the service team for the service task.

2. The method of claim 1, wherein the service task is determined to be linked to the one or more known cases based on a search of the database of the customer service platform cases performed using a code associated with the service case.

3. The method of claim 2, wherein the code comprises an error code, a screenshot, a reportable message or information, or a combination thereof, submitted with the request.

4. The method of claim 1, comprising:
resolving an additional service task associated with an additional service case based on the identified root cause and the one or more known resolutions for the linked one or more known cases.

5. The method of claim 4, wherein the additional service case is associated with an additional client different than the client.

6. The method of claim 4, wherein the client is associated with a first client instance, and wherein the additional service case is associated with an additional client instance different than the first client instance.

7. The method of claim 1, wherein information for two or more service tasks generated for the service case is accessible via the service case without separate communication between the plurality of service teams processing the two or more service tasks.

8. The method of claim 1, wherein the service task comprises at least one of a request task, a problem task, a change task, or an incident task.

9. The method of claim 1, wherein updating the data comprises reflecting a completion or a status of one or more steps for performing the service task by the service team.

10. A system, comprising:
a case agent of a customer service platform, comprising:
a first memory configured to store a first set of instructions; and
a first processor configured to execute the first set of instructions, wherein the first set of instructions cause the first processor to:
receive, from a customer service management interface of the customer service platform, a first request to assign a service task of a service case to a service team of a plurality of service teams working on respective service tasks related to the service case, wherein the first request comprises a case reference identifier, a code, or any combination thereof, wherein the case reference identifier identifies the service case on the customer service platform for a client;
perform a search within a database of the customer service platform using the code; and
in response to determining that the service task is associated with one or more known cases based on the search, link the service task to the one or more known cases prior to assigning the service task to the service team;
a service agent of the service team communicatively coupled to the customer service platform, comprising:
a second memory configured to store a tracking system and a second set of instructions; and
a second processor configured to execute the second set of instructions, wherein the second set of instructions cause the second processor to:
receive, from the case agent of the customer service platform, a second request to perform the service task;
identify, within the tracking system of the service team, a root cause for the service task based on a technical team identifier of the service task being linked to the one or more known cases corresponding to one or more known resolutions; and
update, within the database of the customer service platform, data associated with the service task using technical team identifier of the service team for the service task, wherein the technical team identifier is distinct from the case reference identifier, and wherein the data is accessible from the customer service management interface of the customer service platform using the case reference identifier without reference to the technical team identifier of the service team for the service task.

11. The system of claim 10, wherein each of the plurality of service teams employ respective tracking systems separate from the customer service platform and that use respective technical team identifiers for processing and updating the respective service tasks in the respective tracking systems.

12. The system of claim 10, wherein the second set of instructions cause the second processor of the service agent to:
resolve an additional service task associated with an additional service case based on the identified root cause and the one or more known resolutions for the linked one or more known cases.

13. The system of claim 12, wherein the client is associated with a first client instance, wherein the additional service case is associated with an additional client instance different than the first client instance.

14. The system of claim 10, wherein data for two or more service tasks generated for the service case are accessible via the case reference identifier without separate communication to the plurality of service teams processing the respective service tasks for the service case.

15. The system of claim 10, wherein the service task comprises a request task, a problem task, a change task, or an incident task, or any combination thereof.

16. The system of claim 10, wherein the service task comprises a problem task to identify a reported problem and wherein the one or more known cases comprise one or more known problems.

17. The system of claim 10, wherein, in response to identifying the root cause, the second set of instructions cause the second processor to:
determine and apply a fix, a workaround, a solution, or any combination thereof, associated with the one or more known resolutions to address the service task.

18. The system of claim 10, wherein the service task comprises a change task to implement a change to an application, hardware, or database accessed by a client instance associated with the client and the service team comprises a change implementation team, and wherein the case agent performs the search for the change using the code prior to assigning the change task to the change implementation team, wherein the service case is linked to an existing change based on the search.

19. A tangible, non-transitory, machine-readable medium, comprising machine-readable instructions that, when executed by one or more processors of a customer service platform, cause the one or more processors to:
receive, from a customer service management interface of the customer service platform, a request to assign a service task of a service case to a service team of a plurality of service teams working on respective service tasks related to the service case, wherein the request comprises a case reference identifier, a code, or any combination thereof, wherein the case reference identifier identifies the service case on the customer service platform for a client;
perform a search within a database of the customer service platform using the code;
in response to determining that the service case is associated with one or more existing cases based on the search, link the service case to the one or more existing cases within the database of the customer service platform prior to assigning the service task to the service team, wherein linking the service case to the one or more existing cases facilitates identifying a root cause for the service task and the one or more existing cases;
in response to determining that the service case is separate from the one or more existing cases based on the search, assign the service task to the service team as a new task;
receive, from a service agent communicatively coupled to the customer service platform, a data update associated with the service task, wherein the data update references the service task using a technical team identifier of the service team for the service task within a tracking system of the service team that is separate and distinct from the customer service platform, wherein the technical team identifier is separate and distinct from the case reference identifier;

update, within the database of the customer service platform, data associated with the service task based on the received data update; and present, using the customer service management interface, the updated data from the database of the customer service platform that is associated with service task, wherein the service task is accessed on the customer service management interface using the case reference identifier without reference to the technical team identifier of the service team for the service task.

20. The tangible, non-transitory, machine-readable medium of claim 19, wherein the service team determines and applies one or more resolutions for the service task by identifying the root cause for the service task that is linked to the one or more existing cases corresponding to the one or more resolutions.

\* \* \* \* \*